Patented Aug. 29, 1950

2,520,651

UNITED STATES PATENT OFFICE 2,520,651

ARTIFICIAL CARBONS FOR ELECTRICAL AND THE LIKE USES

Marcel Victor Oswald, Paris, France, assignor to Societe La Carbone Lorraine, Paris, France No Drawing. Application January 30, 1947, Serial No. 725,261. In France February 9, 1946

2 Claims. (Cl. 171—325)

This invention relates to electrical contact material and to commutator brushes for electrical machines and devices. It is an object of the invention to provide a type of contact and carbon or carbo-metallic brushes which owing to its constitution possesses particularly advantageous properties.

The contact pieces and brushes according to this invention are composed of a carbonaceous mass, which may also contain highly conductive metal particles, with particles of one or several polysiloxanes, the particles of the mixture being agglomerated with each other.

The impregnation with silicones will considerably improve the behaviour of the carbon. As a matter of fact they are held energetically through absorption by the carbon particles. They may completely fill the pores and their behaviour when heated is much better than that of non siliceous organic resins. As a mean figure, it may be stated that artificial carbon impregnated with silicones resists temperatures higher by about 100 to 120° C. than those allowable with the same carbons impregnated with synthetic resins. In addition to these advantages the thermic conductivity is increased; in the case of members rubbing one against another, the local heating is reduced. Lastly members thus impregnated become impervious to water, whereby their behaviour to friction is not modified through atmospheric moisture.

Silicones serving for impregnation are constituted by light polymer products having as a general formula R—SiO—R'. In this formula, R and R' designate two monovalent hydrocarbon radicals which may belong to the aliphatic, alicyclic, or simple nucleus or condensed nucleus aromatic series. The simplest examples are constituted by dimethyl-silicone where R and R' are the radical $CH_3$, diphenyl silicone in which R and R' designate the phenyl radical and methyl-phenyl-silicone for which R is the methyl radical and R' the phenyl radical. In a slightly polymerised state, these products form liquid, pasty or solid material according to their grade of polymerization and to the nature of the radical R and R', but in all cases they remain soluble in volatile organic solvents such as benzene, toluene, carbon tetra-chloride, etc.

According to a first form of execution the carbon members which may be in their rough or finished state are impregnated with more or less viscous liquid silicones, either pure or dissolved in a solvent or mixture of suitably chosen solvents. For instance it is possible to use a methyl silicone $OSi(CH_3)_2$ or its solution in an organic solvent such as benzene or butyl oxide.

When impregnating with pure silicone there is obtained a rate of filling of the pores which reaches its maximum, whereas through dilution of the silicone it is possible to obtain impregnation rates therein ranging as desired between 0 and 100% of the complete impregnation.

Once the impregnation is at an end the impregnated material is heated to a temperature ranging between 150 and 250° C. or thereabouts inside a neutral or inert atmosphere so as to polymerize the silicone into a compact, hard, insoluble and infusible substance. If the impregnation is performed with a diluted silicone, the solvent is vaporized preferably with a recovery of said vapors after which the polymerization is performed in accordance with the procedure disclosed hereabove.

According to a second form of execution, it is possible to impregnate the carbon part with a liquid halide adapted to be transformed into a silicone through hydrolysis. For instance it is possible to make use of dimethyl silicone chloride $Cl_2Si(CH_3)_2$. It is possible to use such a halide either pure or in a more or less diluted state in a solvent volatile enough to prevent its evaporation from carrying along with it the alkyl or aryl silicon chloride. Once the impregnation is at an end, the solvent is vaporised if required and the parts are subjected to the action of hot water or of steam. This produces an hydrolysis of the selected chloride or halide with a formation of the corresponding monosilicone. At the temperature of the reaction, the silicone is almost immediately polymerized which leads finally to the same result as when starting from liquid silicone. During this hydrolysis there is formed a halogen acid such as hydrochloric acid, but the major part of this acid is eliminated in its gaseous state during the hydrolysis and at any rate while the impregnated material is being heated for polymerizing the silicones therein.

It is also possible to impregnate the carbon parts by means of a mixture of two or more silicones or else by means of silicones with different substituents such as methyl-ethyl-silicone, methyl-phenyl-silicone or else by mixtures such as methyl- and phenyl- silicones or methyl-ethyl- and methyl-phenyl-silicones.

The impregnation may be carried through in bodies made either of amorphous carbon or else of amorphous carbon mixed with graphite or else of graphite. It is possible for instance to produce parts of amorphous carbon to transform them into graphite through a heat treatment above about 2000° C. and to impregnate them then with silicone.

When dimethyl silicone is used alone the impregnating polymer is particularly rich in silicon being of the order of 38% in weight. When on the contrary silicones are used with higher contents of carbon, the silicone percentage may be considerably less. It reaches for instance 14% of silicone when using diphenyl-silicone. With compound silicones or mixtures of silicones, it is possible to obtain intermediary silicon percentages, say 32% of silicon with methyl-ethyle-silicone, 20% of silicon with methyl-phenyl-silicone, 27.5% with diethyl-silicone, etc.

The impregnation is effected in a previously agglomerated substance from which the gases have been removed or else on a substance baked at a suitable temperature. For instance it is possible to impregnate carbon plates for making electric motor brushes, said plates being baked at temperatures of about 300° to 1500° C. It is also possible to impregnate carbonaceous material which has been partly or totally transformed into artificial graphite by baking above 1800° C. In all cases, the carbonaceous material retains a certain porosity which allows its impregnation. The impregnation may be obtained through immersion in liquid or dissolved silicone and the operation may be accelerated by producing a partial vacuum above the solution so as to remove the air bubbles remaining inside the carbon core. Preferably, I operate at room temperature so as to avoid a premature hardening of the silicone.

I may also exert a certain pressure on the impregnating liquid so as to constrain it to enter more quickly into the carbon pores. When it is possible to avoid complete impregnation, the parts which are not to be impregnated are previously impregnated with a substance either liquid or molten which may be easily removed through dissolution or evaporation, after the silicone has impregnated the material and has become hard. It is possible to use mere water for this purpose. As disclosed it is possible to use also as an impregnating material a mixture of two or more silicones each of which includes radicals R, R' either similar or different. Thus, it is possible to impregnate with a mixture of dimethyl-silicone and methyl-phenyl silicone. In all cases, the hardening of the silicone is executed either by leaving the impregnated members for a long time at room temperature or else preferably by heating for a few hours or more to about 100 to 150° C.

By way of example I may mention the impregnation of parts of amorphous carbon having an apparent specific weight of 1.38 with pure methyl-phenyl-silicone. After polymerization of the latter at a temperature between 125 and 150° C., the specific weight after polymerization rises to about 1.48 and the resistance to flexion to 275 kgs. per sq. cm. as against 180 before treatment.

In all cases the parts, after impregnation with and polymerization of the silicone may be machined in the case where the original parts have not been machined or else they may be submitted to a slight finishing if they were originally machined.

The carbonaceous parts thus prepared show the advantage of being less combustible than those which have not been treated; their electric resistance is not higher although the silicones form electrically insulating material. The thermic conductibility is also increased thereby and consequently electric contact pieces formed therewith are less easily worn through friction and combustion in the case of arcing than identical parts which have received no impregnation with silicones.

A further application of the improved products to the invention appears in the making of brushes for electric motors. Sometimes brushes are required which may have a very regular slightly abrading action, the abrading material in the brush being distributed in a manner as uniform as possible. Silicones provide an excellent solution to this problem as the passage of current and friction produce a slight decomposition which transforms the silicon of the silicones into silica of a colloidal fineness which is very uniformly distributed. The frictional characteristics of the brush are thus also uniform and this avoids thus the formation of scratches which groove or damage the commutators. It is possible also to apply the present method to certain categories of brushes for electrotechnical purposes including mixtures of carbon or graphite and one or more metals such as copper, tin, lead, zinc, silver and the like. To this purpose, it is possible to execute brushes made of graphite and metal or alloy according to the usual method, but they are submitted to impregnation with silicones and to polymerisation as described. This leads to the obtention of carbo-metallic or graphito-metallic brushes showing also a certain polishing effect which lowers substantially the drop in electric voltage at the contacting point.

The same forms of execution are also applicable to agglomerates of metals with carbon or graphite adapted to be used as contact-pieces, for instance in current breakers and the like parts of electric apparatuses. Thus contact pieces made of graphite and silver may be impregnated with silicones which provides excellent results. In the case of disjunctors, the often rough engagements and disengagements which may occur do not risk any more producing cracks or breaks in the carbon or graphite contact-pieces while the resistance at the contact surface is by no means higher than that observed with an impregnated carbon.

The remarkable water-repelling power of the improved carbons allows forming therewith conducting vats made of impregnated carbon or graphite for containing aqueous liquids and chiefly electrolyte solutions. It is not necessary that the entire mass should be impregnated, but it is sufficient for their surface contacting with the electrolyte to be impregnated through a small thickness. Of course various applications of members prepared as described are by no means limitative and have been given out solely by way of examples; the different forms of execution may vary according to the case without modifying the principle of the invention as disclosed in accompanying claims.

What I claim is:
1. A commutator brush or other electric contact piece composed of a mixture of particles of a carbonaceous material as the basic constituent and a polysiloxane intimately agglomerated with each other.
2. An article as defined in claim 1 which also contains particles of a conductive metal.

MARCEL VICTOR OSWALD.

(References on following page)

REFERENCES CITED

The following references are of record in the file of this patent:

UNITED STATES PATENTS

| Number | Name | Date |
|---|---|---|
| 1,053,881 | Scott et al. | Feb. 18, 1913 |
| 1,556,990 | Henry | Oct. 13, 1925 |
| 1,991,487 | Bemis | Feb. 19, 1935 |
| 2,066,176 | Girvin et al. | Dec. 29, 1936 |
| 2,118,898 | Price | May 31, 1938 |
| 2,258,219 | Rochow | Oct. 7, 1941 |
| 2,258,222 | Rochow | Oct. 7, 1941 |
| 2,377,600 | Barker et al. | June 5, 1945 |
| 2,377,689 | Hyde | June 5, 1945 |

OTHER REFERENCES

Scientific American, January 1945, page 28.